T. POTTER.
Safety-Guards for Pocket-Books.

No. 138,581. Patented May 6, 1873.

Witnesses:
Chas. Nida
C. Sidgwick

Inventor:
T. Potter
Per
Attorneys.

UNITED STATES PATENT OFFICE.

THADDEUS POTTER, OF JACKSON, MISSISSIPPI.

IMPROVEMENT IN SAFETY-GUARDS FOR POCKET-BOOKS.

Specification forming part of Letters Patent No. 138,581, dated May 6, 1873; application filed March 29, 1873.

*To all whom it may concern:*

Be it known that I, THADDEUS POTTER, of Jackson, in the county of Hinds and State of Mississippi, have invented a new and Improved Safety-Guard for Pocket-Books, of which the following is a specification:

I propose to have one or more hooks arranged within or between the cover and an inside partition of a pocket-book, and contrivances for causing them to project so as to hook into the pocket of the garment to prevent the book from being picked out of the pocket, the contrivances for throwing them out being so that I can withdraw them readily from the pocket when I wish to take out the book. The device will also be contrived so that when the hooks are thrown out they will be locked so that they cannot be withdrawn except by the device for throwing them out.

Figure 1:
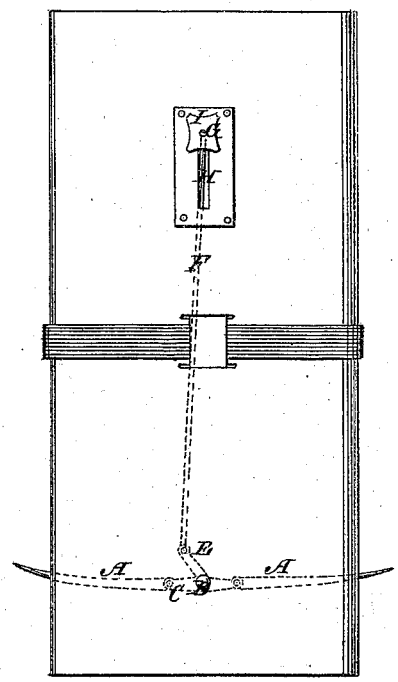
Figure 2:
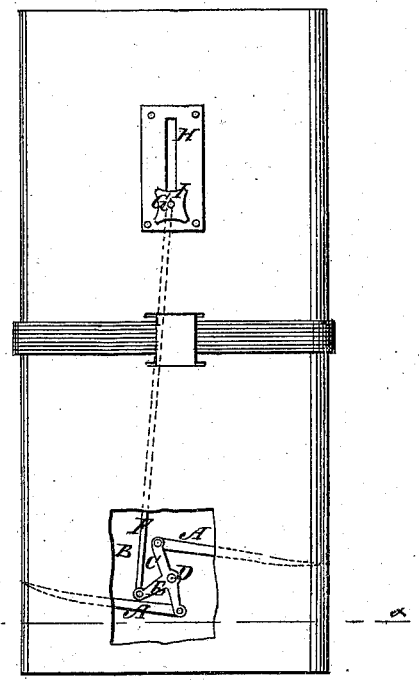
Figure 3:

Figure 1 is a side elevation of a pocket-book with the apparatus shown in the dotted lines, the hooks being thrown out. Fig. 2 is also a side elevation with the hooks withdrawn and a part of the cover broken out to show the apparatus more clearly. Fig. 3 is a cross-section on the line $x\,x$.

Similar letters of reference indicate corresponding parts.

A represents long, sharp, curved pins or hooks arranged between the cover and another plate or sheet, B, the said hooks extending from each edge to the middle of the book, or thereabout, and pivoted to a short bar, G, one to each end, the bar being arranged at its center on a pivot, and having an arm, E, projecting from one side of its middle a short distance, and jointed at the end to a rod, F, extending nearly to the upper end of the book, and jointed to a pin, G, extending out through a slotted plate, H, into a slide, I. By pulling this slide toward the upper end of the pocket-book, bar G will be turned nearly or quite to a line tranverse to the book and parallel with the hooks, and the hooks will be thrust out so as to engage the pocket and prevent the book from being picked out. By sliding it the other way the hooks will be drawn in. The hooks are arranged in the end of the book which will be lowest in the pocket, and curved upward so as to obstruct the pulling of the book out of the pocket. By having the bar C and arm E arranged so that the bar ranges directly across the book transversely when the hooks are out, they will be locked so that they cannot be forced back by pressure on the points.

Having thus described my invention, I claim as new and desire to secure by Letters Patent—

The combination of hooks A, bar C, arm E, rod F, and slide I, with a pocket-book, substantially as described.

THADDEUS POTTER.

Witnesses:
 SIMON JONES,
 GEO. H. SLAUGHTER.